United States Patent
Nakanishi et al.

(10) Patent No.: US 12,448,514 B2
(45) Date of Patent: *Oct. 21, 2025

(54) RESIN COMPOSITION AND MOLDED ARTICLE

(71) Applicant: DAIKIN INDUSTRIES, LTD., Osaka (JP)

(72) Inventors: Koji Nakanishi, Osaka (JP); Toyomitsu Seki, Osaka (JP); Hideki Kono, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 819 days.

This patent is subject to a terminal disclaimer.

(21) Appl. No.: 17/482,938

(22) Filed: Sep. 23, 2021

(65) Prior Publication Data

US 2022/0010131 A1 Jan. 13, 2022

Related U.S. Application Data

(63) Continuation of application No. PCT/JP2020/012261, filed on Mar. 19, 2020.

(30) Foreign Application Priority Data

Mar. 27, 2019 (JP) ................. 2019-060586

(51) Int. Cl.
 *C08L 71/10* (2006.01)
 *C08G 65/40* (2006.01)
 *C08L 27/18* (2006.01)

(52) U.S. Cl.
 CPC ............ *C08L 71/10* (2013.01); *C08L 27/18* (2013.01); *C08G 65/4012* (2013.01)

(58) Field of Classification Search
 CPC ............ C08G 2650/40; C08G 65/4012; C08G 65/4018; C08G 65/4025; C08G 65/4031; C08G 65/4037; C08G 65/4043; C08G 65/405; C08L 71/10; C08L 27/12–18; C08L 71/08
 See application file for complete search history.

(56) References Cited

U.S. PATENT DOCUMENTS

| | | |
|---|---|---|
| 2013/0109810 A1 | 5/2013 | Xie et al. |
| 2014/0187721 A1* | 7/2014 | Ito .................. C08L 101/00 525/151 |
| 2014/0329968 A1 | 11/2014 | Masuda et al. |
| 2014/0342155 A1 | 11/2014 | Abe et al. |
| 2015/0203679 A1 | 7/2015 | Ueda et al. |
| 2016/0163413 A1 | 6/2016 | Ueda et al. |
| 2017/0204233 A1 | 7/2017 | Nakanishi et al. |
| 2017/0301430 A1 | 10/2017 | Iida et al. |

FOREIGN PATENT DOCUMENTS

| | | |
|---|---|---|
| WO | 2012/005133 A1 | 1/2012 |
| WO | 2013/088964 A1 | 6/2013 |
| WO | 2014/024671 A1 | 2/2014 |
| WO | 2015/012346 A1 | 1/2015 |
| WO | 2016/056431 A1 | 4/2016 |

OTHER PUBLICATIONS

International Preliminary Report on Patentability issued Sep. 28, 2021 with translation of the Written Opinion in International Application No. PCT/JP2020/012261.
Extended European Search Report dated Nov. 24, 2022 in counterpart EP Application No. 20776763.3.
International Search Report of PCT/JP2020/012261 dated Jun. 2, 2020 [PCT/ISA/210].

* cited by examiner

*Primary Examiner* — Ana L. Woodward
(74) *Attorney, Agent, or Firm* — Sughrue Mion, PLLC

(57) ABSTRACT

A resin composition containing an aromatic polyether ketone resin (I); and a fluorine-containing copolymer (II), the resin composition satisfying an r2/r1 ratio of 1.60 or lower, wherein r1 is an average dispersed particle size of the fluorine-containing copolymer (II) and r2 is an average dispersed particle size of the fluorine-containing copolymer (II) after melt flow rate measurement at 380° C. and a load of 5000 g and with a preheating time of five minutes in conformity with ASTM D1238. Also disclosed is a pellet obtained by molding the resin composition and a molded article formed from the resin composition or the pellet.

10 Claims, No Drawings

RESIN COMPOSITION AND MOLDED ARTICLE

CROSS REFERENCE TO RELATED APPLICATIONS

This application is a Rule 53(b) Continuation of International Application No. PCT/JP2020/012261 filed Mar. 19, 2020, claiming priority based on Japanese Patent Application No. 2019-060586 filed Mar. 27, 2019, the respective disclosures of which are incorporated herein by reference in their entirety.

TECHNICAL FIELD

The disclosure relates to resin compositions and molded articles.

BACKGROUND ART

Aromatic polyether ketone resins are excellent in strength and heat resistance and are known as super engineering plastics. Fluororesins are excellent in properties such as slidability, heat resistance, chemical resistance, solvent resistance, weather resistance, flexibility, and electrical properties and are used in various products.

For example, Patent Literature 1 proposes a resin composition comprising an aromatic polyether ketone resin (I), and a fluororesin (II), the fluororesin (II) being a copolymer of tetrafluoroethylene and a perfluoroethylenic unsaturated compound represented by the following formula (1):

$$CF_2=CF-Rf^1 \quad (1)$$

wherein $Rf^1$ represents $-CF_3$ or $-ORf^2$, and $Rf^2$ represents a C1 to C5 perfluoroalkyl group; the composition comprising the aromatic polyether ketone resin (I) and the fluororesin (II) at a mass ratio (I):(II) of 95:5 to 50:50; the fluororesin (II) being dispersed as particles in the aromatic polyether ketone resin (I) and having an average dispersed particle size of 3.0 µm or smaller.

CITATION LIST

Patent Literature

Patent Literature 1: WO 2012/005133

SUMMARY

The disclosure relates to a resin composition containing:
an aromatic polyether ketone resin (I); and
a fluorine-containing copolymer (II),
the resin composition satisfying an r2/r1 ratio of 1.60 or lower,
wherein r1 is an average dispersed particle size of the fluorine-containing copolymer (II) and r2 is an average dispersed particle size of the fluorine-containing copolymer (II) after melt flow rate measurement at 380° C. and a load of 5000 g and with a preheating time of five minutes in conformity with ASTM D1238.

Advantageous Effects

The resin composition of the disclosure having any of the above structures can produce a molded article that does not cause surface peeling after molding and is excellent in tensile elongation at break and is also excellent in low dielectric properties.

DESCRIPTION OF EMBODIMENTS

The resin composition of the disclosure contains an aromatic polyether ketone resin (I) and a fluorine-containing copolymer (II). In the resin composition of the disclosure, the fluorine-containing copolymer (II) is preferably dispersed in the form of particles in the aromatic polyether ketone resin (I). In such a case, usually, the aromatic polyether ketone resin (I) forms a continuous phase and the fluorine-containing copolymer (II) forms a dispersed phase.

The resin composition of the disclosure satisfies an r2/r1 ratio of 1.60 or lower, wherein r1 is the average dispersed particle size of the fluorine-containing copolymer (II) and r2 is the average dispersed particle size of the fluorine-containing copolymer (II) after melt flow rate measurement (MFR) at 380° C. and a load of 5000 g and with a preheating time of five minutes in conformity with ASTM D1238.

Since fluorine-containing copolymers are difficult to mix with other resins, resin compositions containing fluorine-containing copolymers cause surface peeling during molding and hardly develop mechanical properties. The inventors of the disclosure performed studies on solutions to the above issues and focused on the shear rate during kneading. They found that effective application of shearing during kneading enables production of a resin composition that can reduce aggregation or coalescence of fluorine-containing copolymer particles even under heating.

The resin composition of the disclosure having any of the above structures can reduce surface peeling during molding. Furthermore, the resin composition of the disclosure can produce a molded article that retains mechanical properties and is excellent in tensile elongation at break even after molding. Furthermore, the resin composition of the disclosure can produce a molded article also excellent in impact resistance, toughness, and flexibility. Furthermore, the resin composition can provide a molded article with low permittivity.

The r1 is the average dispersed particle size of the fluorine-containing copolymer (II) in the resin composition of the disclosure. The r2 is the average dispersed particle size of the fluorine-containing copolymer (II) in the resin composition of the disclosure after melt flow rate measurement at 380° C. and a load of 5000 g and with a preheating time of five minutes in conformity with ASTM D1238.

The r2/r1 ratio is 1.60 or lower. To achieve further excellent tensile elongation at break, impact resistance, toughness, flexibility, and low dielectric properties, the r2/r1 ratio is more preferably 1.50 or lower, still more preferably 1.47 or lower.

If the particles of the fluorine-containing copolymer (II) dispersed aggregate in the MFR measurement to form coarse particles of the fluorine-containing copolymer (II), the r2/r1 ratio increases. Thus, an r2/r1 ratio of 1.60 or lower indicates that the particles of the fluorine-containing copolymer (II) are less likely to aggregate in the MFR measurement.

In the resin composition of the disclosure, the fluorine-containing copolymer (II) preferably has an average dispersed particle size of 2.5 µm or smaller. An average dispersed particle size of 2.5 µm or smaller can lead to production of a molded article further excellent in tensile elongation at break, impact resistance, toughness, flexibility, and low dielectric properties.

To provide a molded article having higher properties and to achieve better moldability, the average dispersed particle size of the fluorine-containing copolymer (II) is more preferably 2.0 µm or smaller, still more preferably 1.5 µm or smaller. The lower limit of the average dispersed particle size may be, but is not limited to, 0.01 µm.

In the resin composition of the disclosure, the fluorine-containing copolymer (II) preferably has a maximum dispersed particle size of 5 µm or smaller. A maximum dispersed particle size of 5 µm or smaller can lead to improvement of the tensile elongation at break, impact resistance, toughness, flexibility, and low dielectric properties. A maximum dispersed particle size of 3 µm or smaller can lead to production of a molded article further excellent in tensile elongation at break, impact resistance, toughness, flexibility, and low dielectric properties. The lower limit of the maximum dispersed particle size may be, but is not limited to, 0.01 µm.

The average dispersed particle size and the maximum dispersed particle size of the fluorine-containing copolymer (II) in the resin composition of the disclosure are determined by the following procedure.

The average dispersed particle size of the fluorine-containing copolymer in the resin composition can be determined as follows: a piece is cut out of a strand or pellet of the resin composition and is cut perpendicularly to the extrusion direction, and the cross-section is observed using a confocal laser scanning microscope. The resulting microscopic image is analyzed using image analysis software (Image J). The dispersed phase is selected and the equivalent circle diameters are determined. The equivalent circle diameters of 20 dispersed phases are calculated and averaged to determine the average dispersed particle size.

The aromatic polyether ketone resin (I) may be any one containing a repeating unit having an arylene group, an ether group (—O—), and a carbonyl group (—C(=O)—). For example, it contains a repeating unit represented by any of the following formulas (a1) to (a5):

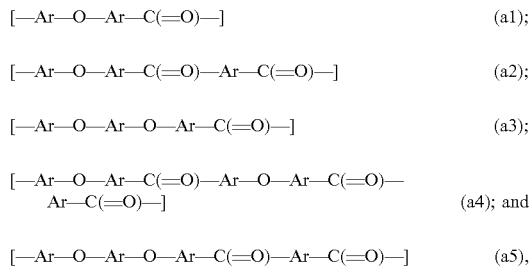

[—Ar—O—Ar—C(=O)—] (a1);

[—Ar—O—Ar—C(=O)—Ar—C(=O)—] (a2);

[—Ar—O—Ar—O—Ar—C(=O)—] (a3);

[—Ar—O—Ar—C(=O)—Ar—O—Ar—C(=O)—Ar—C(=O)—] (a4); and

[—Ar—O—Ar—O—Ar—C(=O)—Ar—C(=O)—] (a5), wherein Ar is an optionally substituted divalent aromatic hydrocarbon ring group.

Examples of the divalent aromatic hydrocarbon ring group for Ar include: C6-C10 arylene groups such as a phenylene group (e.g., an o-, m-, or p-phenylene group) and a naphthylene group; biarylene groups (each arylene group has a carbon number of 6 to 10) such as a biphenylene group (e.g., a 2,2'-biphenylene group, a 3,3'-biphenylene group, or a 4,4'-biphenylene group); and terarylene groups (each arylene group has a carbon number of 6 to 10) such as an o-, m-, or p-terphenylene group. These aromatic hydrocarbon ring groups may have any substituent such as a halogen atom, an alkyl group (e.g., a linear or branched C1-C4 alkyl group such as a methyl group), a haloalkyl group, a hydroxy group, an alkoxy group (e.g., a linear or branched C1-C4 alkoxy group such as a methoxy group), a mercapto group, an alkylthio group, a carboxyl group, a sulfo group, an amino group, a N-substituted amino group, or a cyano group. In the repeating units (a1) to (a5), Ar groups may be the same as or different from each other.

Ar is preferably a phenylene group (e.g., a p-phenylene group) or a biphenylene group (e.g., a 4,4'-biphenylene group).

An example of a resin having the repeating unit (a1) is polyetherketone (e.g., "PEEK-HT" available from Victrex). An example of a resin having the repeating unit (a2) is polyetherketoneketone (e.g., "PEKK" available from Arkema+Oxford Performance Materials). Examples of a resin having the repeating unit (a3) include polyetheretherketone (e.g., "VICTREX PEEK" available from Victrex; "Vestakeep®" available from Evonik; "Vestakeep-J" available from Daicel-Evonik; "KetaSpire®" available from Solvay Specialty Polymers), and polyether-diphenyl-ether-phenyl-ketone-phenyl (e.g., "Kadel®" available from Solvay Specialty Polymers). An example of a resin having the repeating unit (a4) is polyetherketoneetherketoneketone (e.g., "VICTREX ST" available from Victrex). An example of a resin having the repeating unit (a5) is polyetherether-ketoneketone.

In the repeating unit having an arylene group, an ether group, and a carbonyl group, the ratio (E/K) of an ether segment (E) to a ketone segment (K) is, for example, 0.5 to 3, preferably about 1 to 2.5. The ether segment imparts flexibility to the molecule chain and the ketone segment imparts stiffness to the molecule chain. Thus, the larger the amount of the ether segment is, the higher the crystallization speed is and the higher the crystallinity to be finally achieved tends to be, while the larger the amount of the ketone segment is, the higher the glass transition temperature and the melting point tend to be.

These aromatic polyether ketone resins (I) may be used alone or in combination of two or more.

Preferred among these aromatic polyether ketone resins (I) are aromatic polyether ketone resins having any of the repeating units (a1) to (a4). For example, the aromatic polyether ketone resin (I) preferably includes at least one resin selected from the group consisting of polyetherketone, polyetheretherketone, polyetherketoneketone, and polyetherketoneetherketoneketone, more preferably at least one resin selected from the group consisting of polyetherketone, polyetheretherketone, and polyetherketoneketone. Particularly preferred is polyetherketoneketone in order to produce a molded article further excellent in tensile elongation at break, impact resistance, toughness, flexibility, and low dielectric properties.

The aromatic polyether ketone resin (I) preferably has a melt flow rate (MFR), which is measured at a temperature of 380° C. and a load of 5000 g, of 1 to 150 g/10 min, more preferably 5 to 130 g/10 min, still more preferably 10 to 100 g/10 min. A MFR within this range can lead to production of a molded article further excellent in tensile strength.

The MFR of the aromatic polyether ketone resin (I) is determined using a melt indexer in conformity with ASTM D1238.

The aromatic polyether ketone resin (I) preferably has a melt viscosity of 0.01 to 4.0 kNsm$^{-2}$ at 60 sec$^{-1}$ and 390° C. A melt viscosity within this range can lead to improvement of processability and production of a molded article excellent in tensile strength. The lower limit of the melt viscosity is preferably 0.05 kNsm$^{-2}$, more preferably 0.10 kNsm$^{-2}$, still more preferably 0.15 kNsm$^{-2}$. The upper limit of the melt viscosity is preferably 2.5 kNsm$^{-2}$, more preferably 1.5 kNsm$^{-2}$, still more preferably 1.0 kNsm$^{-2}$.

The melt viscosity of the aromatic polyether ketone resin (I) is determined in conformity with ASTM D3835-02.

The aromatic polyether ketone resin (I) preferably has a glass transition temperature of 130° C. or higher, more preferably 135° C. or higher, still more preferably 140° C. or higher. A glass transition temperature within this range can lead to production of a resin composition excellent in heat resistance. The upper limit of the glass transition temperature is preferably, but is not limited to, 220° C. or lower, more preferably 180° C. or lower in terms of moldability.

The glass transition temperature is measured in conformity with JIS K 7121 using a differential scanning calorimeter (DSC) at a temperature-increasing rate of 20° C./min.

The aromatic polyether ketone resin (I) preferably has a melting point of 300° C. or higher, more preferably 320° C. or higher. A melting point within this range can lead to improvement of the heat resistance of a molded article to be obtained. The melting point is preferably 380° C. or lower. An aromatic polyether ketone resin having a melting point not lower than 380° C. may severely thermally deteriorates the fluorine-containing copolymer when they are kneaded to each other, and thus, the physical properties may not be maintained.

The melting point is the temperature corresponding to the maximum value on a heat-of-fusion curve with a temperature-increasing rate of 10° C./min using a differential scanning calorimeter (DSC).

The fluorine-containing copolymer (II) is, for example, a polymer having a polymerized unit based on at least one fluorine-containing ethylenic monomer. The fluorine-containing copolymer (II) is preferably a melt-fabricable fluororesin. One fluorine-containing copolymer (II) may be used, or two or more fluorine-containing copolymer (II) may be used.

Examples of the fluorine-containing copolymer (II) include a tetrafluoroethylene (TFE)/hexafluoropropylene (HFP) copolymer, a TFE/HFP/perfluoro(alkyl vinyl ether) (PAVE) copolymer, a TFE/PAVE copolymer (PFA), an ethylene (Et)/TFE copolymer, an Et/TFE/HFP copolymer, polychlorotrifluoroethylene (PCTFE), a chlorotrifluoroethylene (CTFE)/TFE copolymer, a CTFE/TFE/PAVE copolymer, an Et/CTFE copolymer, a TFE/vinylidene fluoride (VdF) copolymer, a VdF/HFP/TFE copolymer, a VdF/HFP copolymer, polyvinylidene fluoride (PVdF), and polyvinyl fluoride (PVF). As long as it is melt-fabricable, low molecular weight polytetrafluoroethylene (PTFE) may also be used.

PAVE preferably contains a C1-C6 alkyl group, and examples thereof include perfluoro(methyl vinyl ether), perfluoro(ethyl vinyl ether), perfluoro(propyl vinyl ether), and perfluoro(butyl vinyl ether).

The fluorine-containing copolymer (II) is more preferably a copolymer of tetrafluoroethylene (TFE) and a perfluoroethylenic unsaturated compound represented by the following formula (1):

$$CF_2=CF-Rf^1 \quad (1)$$

wherein $Rf^1$ is $-CF_3$ or $-ORf^2$, where $Rf^2$ is a C1-C5 perfluoroalkyl group. When $Rf^1$ is $-ORf^2$, $Rf^2$ is preferably a C1-C3 perfluoroalkyl group. Use of the fluorine-containing copolymer (II) can provide a molded article excellent in tensile properties, flexibility, impact resistance, and low permittivity. The expression "excellent in tensile properties" means that the tensile elongation at break is high.

In order to provide a molded article further excellent in tensile elongation at break, impact resistance, flexibility, and low permittivity, the perfluoroethylenic unsaturated compound represented by the formula (1) is preferably at least one selected from the group consisting of hexafluoropropylene (HFP), perfluoro(methyl vinyl ether) (PMVE), perfluoro(ethyl vinyl ether) (PEVE), and perfluoro(propyl vinyl ether) (PPVE), more preferably at least one selected from the group consisting of hexafluoropropylene and perfluoro(propyl vinyl ether).

The fluorine-containing copolymer (II) is still more preferably at least one selected from the group consisting of a TFE/HFP copolymer, a TFE/HFP/PPVE copolymer, and a TFE/PPVE copolymer, particularly preferably at least one selected from the group consisting of a TFE/HFP copolymer and a TFE/HFP/PPVE copolymer.

The fluorine-containing copolymer (II) preferably contains 98 to 75% by mass of a polymerized unit (TFE unit) based on TFE and 2 to 25% by mass of the perfluoroethylenic unsaturated compound represented by the formula (1) relative to all polymerized units. The lower limit of the amount of TFE constituting the fluorine-containing copolymer (II) is more preferably 77% by mass, still more preferably 80% by mass, particularly preferably 83% by mass, more particularly preferably 85% by mass. The upper limit of the amount of TFE constituting the fluorine-containing copolymer (II) is more preferably 97% by mass, still more preferably 95% by mass, particularly preferably 92% by mass.

The lower limit of the amount of the perfluoroethylenic unsaturated compound represented by the formula (1) constituting the fluorine-containing copolymer (II) is more preferably 3% by mass, still more preferably 5% by mass. The upper limit of the amount of the perfluoroethylenic unsaturated compound represented by the formula (1) constituting the fluorine-containing copolymer (II) is more preferably 23% by mass, still more preferably 20% by mass, particularly preferably 17% by mass, further particularly preferably 15% by mass.

The fluorine-containing copolymer (II) is preferably a copolymer consisting of TFE and a perfluoroethylenic compound represented by the formula (1).

The fluorine-containing copolymer (II) preferably has a melt viscosity of 0.2 to 4.0 $kNsm^{-2}$ at 60 $sec^{-1}$ and 390° C. A melt viscosity within this range can lead to improvement of the processability and production of a molded article further excellent in tensile elongation at break, impact resistance, toughness, flexibility, and low dielectric properties. The lower limit of the melt viscosity is more preferably 0.25 $kNsm^{-2}$, still more preferably 0.3 $kNsm^{-2}$, particularly preferably 0.35 $kNsm^{-2}$, most preferably 0.4 $kNsm^{-2}$. The upper limit of the melt viscosity is more preferably 3.7 $kNsm^{-2}$, still more preferably 3.6 $kNsm^{-2}$, particularly preferably 3.5 $kNsm^2$.

The melt viscosity of the fluorine-containing copolymer (II) is determined in conformity with ASTM D3835-02.

The fluorine-containing copolymer (II) preferably has a melt flow rate (MFR), which is measured at a temperature of 380° C. and a load of 5000 g, of 0.1 to 100 g/10 min, more preferably 0.5 to 80 g/10 min, still more preferably 0.5 to 70 g/10 min. A MFR within this range can lead to production of a molded article further excellent in tensile elongation at break, impact resistance, toughness, flexibility, and low dielectric properties.

The MFR of the fluorine-containing copolymer (II) is determined using a melt indexer in conformity with ASTM D1238.

The melting point of the fluorine-containing copolymer (II) may be any value, and is preferably equal to or lower than the melting point of the aromatic polyetherketone resin (I) because the fluorine-containing copolymer (II) is preferably already in a molten state at a temperature where the aromatic polyether ketone resin (I) used in molding melts.

For example, the melting point of the fluorine-containing copolymer (II) is preferably 200° C. to 323° C., more preferably 220° C. to 320° C., still more preferably 240° C. to 315° C. The melting point of the fluorine-containing copolymer (II) is determined as the temperature corresponding to the maximum value on a heat-of-fusion curve with a temperature-increasing rate of 10° C./min using a differential scanning calorimeter (DSC).

The fluorine-containing copolymer (II) may be treated with fluorine gas or ammonia by a known method in advance.

To reduce aggregation and coalescence of the fluorine-containing copolymer phase and to easily control the rate of change of the dispersed particle size to a desired range in the resin composition of the disclosure, a fluorine-containing copolymer containing a reactive functional group can be used. Specific examples of the reactive functional group include, but are not limited to, a vinyl group, an epoxy group, a carboxy group, an acid anhydride group, an ester group, an aldehyde group, a carbonyldioxy group, a haloformyl group, an alkoxycarbonyl group, an amino group, a hydroxy group, a styryl group, a methacrylic group, an acrylic group, a ureido group, a mercapto group, a sulfide group, an isocyanate group, and a hydrolyzable silyl group. Preferred among these include at least one selected from the group consisting of an epoxy group, a carboxy group, an acid anhydride group, an amino group, and a hydroxyl group, with at least one selected from the group consisting of a carboxy group and an acid anhydride group being preferred. The fluorine-containing copolymer may contain two or more of these reactive functional groups. The reactive functional group(s) may be introduced into either a main chain end or a side chain of the fluorine-containing copolymer.

The fluorine-containing copolymer containing a reactive functional group may have any functional group content. The amount is preferably 0.01 mol % to 15 mol % or less in order to sufficiently proceed the reaction and to prevent deterioration of the fluidity.

In the resin composition of the disclosure, the aromatic polyether ketone resin (I) and the fluorine-containing copolymer (II) preferably satisfy a melt viscosity ratio (I)/(II) (aromatic polyether ketone resin (I)/fluorine-containing copolymer (II)) of 0.01 to 5.0. A melt viscosity ratio (I)/(II) within this range can lead to production of a molded article further excellent in tensile elongation at break, impact resistance, toughness, flexibility, and low dielectric properties. The lower limit of the melt viscosity ratio (I)/(II) is more preferably 0.02, still more preferably 0.025, particularly preferably 0.03. The upper limit of the melt viscosity ratio (I)/(II) is more preferably 4.0, still more preferably 3.0, particularly preferably 2.5, more particularly preferably 2.0, most preferably 1.8.

In the resin composition of the disclosure, the mass ratio (I):(II) between the aromatic polyether ketone resin (I) and the fluorine-containing copolymer (II) is preferably, but is not limited to, 99:1 to 30:70, for example. The mass ratio is more preferably 95:5 to 35:65, still more preferably 95:5 to 40:60.

The resin composition of the disclosure preferably has a melt flow rate (MFR) of 0.1 to 100 g/10 min, more preferably 1 to 80 g/10 min, at 380° C. The resin composition having a MFR within this range is further excellent in fluidity. With a MFR lower than this range, the molding processability may be poor. With a MFR higher than this range, desired performance may not be achieved. The MFR is a value determined at 380° C. and a load of 5 kg and with a preheating time of five minutes in conformity with ASTM D1238.

The resin composition of the disclosure preferably has a relative permittivity of 2.60 or lower, more preferably 2.58 or lower, still more preferably 2.55 or lower. A relative permittivity lower than this range can lead to production of a resin composition having a low dielectric loss that has been difficult to achieve in conventional cases. The lower limit of the relative permittivity is preferably, but not limited to, 2.30 or higher. As the relative proportion of the fluorine-containing copolymer increases to the point where the relative permittivity is less than 2.30, the mechanical properties greatly decrease and desired mechanical properties are difficult to obtain.

The relative permittivity is a value determined by a cavity resonator perturbation method.

In a preferred embodiment, the resin composition of the disclosure satisfies an r2/r1 ratio of 1.60 or lower, wherein r1 is an average dispersed particle size of the fluorine-containing copolymer (II) and r2 is an average dispersed particle size of the fluorine-containing copolymer (II) after melt flow rate measurement at 380° C. and a load of 5000 g and with a preheating time of five minutes in conformity with ASTM D1238, and the aromatic polyether ketone resin (I) is PEKK.

The resin composition of the disclosure may further contain an optional component, if needed, other than the aromatic polyether ketone resin (I) and the fluorine-containing copolymer (II). Non-limiting examples of the optional component other than the aromatic polyether ketone resin (I) and the fluorine-containing copolymer (II) include fibrous reinforcements such as whiskers (e.g., potassium titanate), glass fiber, asbestos fiber, carbon fiber, ceramic fiber, potassium titanate fiber, aramid fiber, and other high-strength fibers; inorganic fillers such as talc, mica, clay, carbon powder, graphite, artificial graphite, natural graphite, and glass beads; colorants; usually used inorganic or organic fillers such as flame retarders; lubricants such as silicone oil and molybdenum disulfide; pigments; conducting agents such as carbon black; impact resistance improvers such as rubber; lubricants such as magnesium stearate; ultraviolet absorbers such as benzotriazole compounds; foaming agents such as boron nitride; and other additives.

These additives in amounts that do not impair the effects of the disclosure may be added to the aromatic polyether ketone resin (I) which serves as a material, or to the fluorine-containing copolymer (II) which serves as a material. Also, these additives in amounts that do not impair the effects of the disclosure may be added to the materials in a molten state by, for example, side feeding upon kneading of the aromatic polyether ketone resin (I) and the fluorine-containing copolymer (II).

Fibrous Filler (III)

The resin composition of the disclosure preferably further contains a fibrous filler (III). Examples of the fibrous filler used in the resin composition of the disclosure include fibrous inorganic fillers such as glass fiber, carbon fiber, carbon milled fiber, metal fiber, asbestos, rock wool, ceramics fiber, slag fiber, potassium titanate whisker, boron whisker, aluminum borate whisker, calcium carbonate whisker, titanium oxide whisker, wollastonite, xonotlite, palygorskite (attapulgite), and sepiolite; heat resistant fibrous organic fillers which are typified by heat resistant organic fibers, such as aramid fiber, polyimide fiber, and polybenzothiazole fiber; and fibrous fillers prepared by coating the surfaces of these fillers with a different material such as a metal or a metal oxide. Examples of the fillers prepared by coating the surfaces of the exemplified fillers with a different material include metal-coated glass fiber and metal-coated carbon fiber. The surfaces may be coated with a different material by any method. Examples of the method include known plating processes such as electrolytic plating, electroless plating, and melt plating; a vacuum deposition process; an ion plating process; CVD processes such as thermal CVD, MOCVD, and plasma CVD; a PVD process; and a sputtering process. Preferred among these fibrous fillers include at least one selected from the group consisting of glass fiber, carbon fiber, carbon milled fiber, and aramid fiber, with at least one selected from the group consisting of glass fiber and carbon fiber being more preferred.

The fibrous filler preferably has a fiber diameter of 0.1 to 20 µm. The upper limit of the fiber diameter is more preferably 18 µm, still more preferably 15 µm. The lower limit of the fiber diameter is more preferably 1 µm, still more preferably 6 µm. The fiber diameter indicates the number average fiber diameter. The number average fiber diameter is a value calculated from scanning electron microscopic images of the residues collected after the molded article is dissolved in a solvent or after the resin is decomposed with a basic compound and the ash residues collected after the molded article is burned into ashes in a crucible.

When the fibrous filler in the resin composition of the disclosure is glass fiber, the glass fiber may have any of a variety of glass compositions such as compositions of A-glass, C-glass, and E-glass. Such glass filler may contain a component such as $TiO_2$, $SO_3$, or $P_2O_5$, if needed. Preferred among these is E-glass (alkali-free glass). The glass fiber is preferably surface-treated with a known surface-treating agent such as a silane coupling agent, a titanate coupling agent, or an aluminate coupling agent in order to improve the mechanical strength. Also, the glass fiber is preferably bundled with a resin such as an olefinic resin, a styrene resin, an acrylic resin, a polyester resin, an epoxy resin, or a urethane resin. Particularly preferred are an epoxy resin and a urethane resin in order to increase the mechanical strength. The bundled glass fiber contains a sizing agent attached thereto preferably in an amount of 0.1 to 3% by mass, more preferably in an amount of 0.2 to 1% by mass based on 100% by mass of the glass fiber. The fibrous filler used in the resin composition of the disclosure may be glass fiber with a flat cross-section. The glass fiber with a flat cross-section preferably has an average major axis of the fiber cross-section of 10 to 50 µm, more preferably 15 to 40 µm, still more preferably 20 to 35 µm, and an average of the ratios of the major axis to the minor axis (major axis/minor axis) is preferably 1.5 to 8, more preferably 2 to 6, still more preferably 2.5 to 5. Use of a glass fiber with a flat cross-section in which the average of the ratios of the major axis to the minor axis is within this range leads to greater improvement in anisotropy than use of fiber with a non-circular cross-section in which the average of the ratios of the major axis to the minor axis is less than 1.5. Examples of the shape of the flat cross-section include a flat shape, an elliptical shape, an eye-brow shape, a trefoil shape, and a non-circular shape similar to any of these shapes. In order to improve the mechanical strength and the low anisotropy, a flat shape is preferred among these. The glass fiber with a flat cross-section preferably has a ratio between an average fiber length and an average fiber diameter (aspect ratio) of 2 to 120, more preferably 2.5 to 70, still more preferably 3 to 50. With a ratio between the fiber length and the average fiber diameter of lower than 2, an effect of improving the mechanical strength may be poor. With a ratio between the fiber length and the average fiber diameter of higher than 120, the anisotropy may be high and the appearance of the molded article may be poor. The average fiber diameter of the glass fiber with a flat cross-section is the number-average fiber diameter obtained when the flat cross-sectional shape is converted into a true circular shape having the same area as the flat cross-sectional shape. The average fiber length refers to the number average fiber length of the fiber in the resin composition of the disclosure. The number average fiber length is a value calculated using an image analyzer from optical microscopic images of the residual fillers collected after the molded article is subjected to treatment such as ashing at high temperature, dissolution in a solvent, or decomposition with chemicals. The value is obtained without counting fibers having a length not longer than the fiber diameter.

The fibrous filler (III) is preferably present in an amount of 0 to 50% by mass, more preferably 5 to 40% by mass, still more preferably 10 to 30% by mass relative to the resin composition of the disclosure.

(Different Additive)

In order to improve the design, for example, of the resin composition of the disclosure, additives used in these improvements are advantageously used. These additives are described in detail below.

(IV) Dye and Pigment

The resin composition of the disclosure may further contain any of a variety of dyes and pigments to provide a molded article exhibiting a variety of design. Examples of dyes and pigments to be used in the resin composition of the disclosure include perylene-based dyes, coumarin-based dyes, thioindigo-based dyes, anthraquinone-based dyes, thioxanthone-based dyes, ferrocyanides such as Prussian blue, perinone-based dyes, quinoline-based dyes, quinacridone-based dyes, dioxazine-based dyes, isoindolinone-based dyes, and phthalocyanine-based dyes. The resin composition of the disclosure may further contain a metallic pigment to achieve better metallic color. A preferred metallic pigment is aluminum powder. Mixing a fluorescent brightener or other light-emitting fluorescent dyes can provide a better design effect which brings out the luminescent color.

(V) Compound Having Heat-Absorbing Ability

The resin composition of the disclosure may contain a compound having a heat-absorbing ability. Preferred examples of this compound include various metal compounds having an excellent near-infrared light absorbing ability such as a phthalocyanine-based near-infrared absorber, a metal oxide-based near-infrared absorber (e.g., ATO, ITO, iridium oxide, ruthenium oxide, imonium oxide, or titanium oxide), and a metal boride-based or tungsten oxide-based near-infrared absorber such as lanthanum boride, cerium boride, or tungsten boride; and carbon filler. An example of the phthalocyanine-based near-infrared absorber is MIR-362 commercially available from Mitsui Chemicals, Inc., which is easily available. Examples of the carbon filler include carbon black, graphite (including both natural and artificial), and fullerene. Preferred are carbon black and graphite. These may be used alone or in combination of two or more. The phthalocyanine-based near-infrared absorber is preferably present in an amount of 0.0005 to 0.2 parts by mass, more preferably 0.0008 to 0.1 parts by mass, still more preferably 0.001 to 0.07 parts by mass relative to 100 parts by mass of the resin composition of the disclosure. The metal oxide-based near-infrared absorber, metal boride-based near-infrared absorber, and carbon filler are each preferably present in an amount of 0.1 to 200 ppm (proportion by mass), more preferably 0.5 to 100 ppm, in the resin composition of the disclosure.

(VI) Highly Light-Reflective White Pigment

The resin composition of the disclosure may contain a highly light-reflective white pigment to achieve a light-reflecting effect. Such a white pigment is particularly preferably a titanium dioxide pigment, especially titanium dioxide treated with an organic surface-treating agent such as silicone. The highly light-reflective white pigment is preferably present in an amount of 3 to 30 parts by mass, more preferably 8 to 25 parts by mass, relative to 100 parts by mass of the resin composition. Two or more highly light-reflective white pigments may be used in combination.

(VII) Ultraviolet Absorber

The resin composition of the disclosure may contain an ultraviolet absorber to achieve weather resistance. Specific examples of the ultraviolet absorber include benzophenone-based ultraviolet absorbers such as 2,4-dihydroxybenzophenone, 2-hydroxy-4-methoxybenzophenone, 2-hydroxy-4-octoxybenzophenone, 2-hydroxy-4-benzyloxybenzophenone, 2-hydroxy-4-methoxy-5-sulfoxybenzophenone, 2,2'-dihydroxy-4-methoxybenzophenone, 2,2',4,4'-tetrahydroxybenzophenone, 2,2'-dihydroxy-4,4'-dimethoxybenzophenone, 2,2'-dihydroxy-4,4'-dimethoxy-5-sodiumsulfoxybenzophenone, bis(5-benzoyl-4-hydroxy-2-methoxyphenyl) methane, 2-hydroxy-4-n-dodecyloxybenzophenone, and 2-hydroxy-4-methoxy-2'-carboxybenzophenone. Specific examples of the ultraviolet absorber include benzotriazole-based ultraviolet absorbers such as 2-(2-hydroxy-5-methylphenyl)benzotriazole, 2-(2-hydroxy-5-tert-octylphenyl) benzotriazole, 2-(2-hydroxy-3,5-dicumylphenyl) phenylbenzotriazole, 2-(2-hydroxy-3-tert-butyl-5-methylphenyl)-5-chlorobenzotriazole, 2,2'-methylenebis[4-(1,1,3,3-tetramethylbutyl)-6-(2H-benzotriazol-2-yl)phenol], 2-(2-hydroxy-3,5-di-tert-butylphenyl)benzotriazole, 2-(2-hydroxy-3,5-di-tert-butylphenyl)-5-chlorobenzotriazole, 2-(2-hydroxy-3,5-di-tert-amylphenyl)benzotriazole, 2-(2-hydroxy-5-tert-octylphenyl)benzotriazole, 2-(2-hydroxy-5-tert-butylphenyl) benzotriazole, 2-(2-hydroxy-4-octoxyphenyl)benzotriazole, 2,2'-methylenebis(4-cumyl-6-benzotriazolephenyl), 2,2'-p-phenylenebis(1,3-benzoxazin-4-one), 2-[2-hydroxy-3-(3,4,5,6-tetrahydrophthalimidomethyl)-5-methylphenyl]benzotriazole, and polymers having a 2-hydroxyphenyl-2H-benzotriazole skeleton such as a copolymer of 2-(2'-hydroxy-5-methacryloxyethylphenyl)-2H-benzotriazole and a vinyl-based monomer copolymerizable with this monomer and a copolymer of 2-(2'-hydroxy-5-acryloxyethylphenyl)-2H-benzotriazole and a vinyl-based monomer copolymerizable with this monomer. Specific examples of the ultraviolet absorber include hydroxyphenyltriazine-based ultraviolet absorbers such as 2-(4,6-diphenyl-1,3,5-triazin-2-yl)-5-hexyloxyphenol, 2-(4,6-diphenyl-1,3,5-triazin-2-yl)-5-methyloxyphenol, 2-(4,6-diphenyl-1,3,5-triazin-2-yl)-5-ethyloxyphenol, 2-(4,6-diphenyl-1,3,5-triazin-2-yl)-5-propyloxyphenol, and 2-(4,6-diphenyl-1,3,5-triazin-2-yl)-5-butyloxyphenol. Examples also include compounds obtainable by replacing the phenyl group in any of the above exemplified compounds by a 2,4-dimethylphenyl group, such as 2-(4,6-bis(2,4-dimethylphenyl)-1,3,5-triazin-2-yl)-5-hexyloxyphenol. Specific examples of the ultraviolet absorber include cyclic imino ester-based ultraviolet absorbers such as 2,2'-p-phenylenebis(3,1-benzoxazin-4-one), 2,2'-m-phenylenebis(3,1-benzoxazin-4-one), and 2,2'-p,p'-diphenylenebis(3,1-benzoxazin-4-one). Specific examples of the ultraviolet absorber also include cyanoacrylate-based ultraviolet absorbers such as 1,3-bis-[(2'-cyano-3',3'-diphenylacryloyl)oxy]-2,2-bis[(2-cyano-3,3-diphenylacryloyl)oxy] methyl)propane and 1,3-bis-[(2-cyano-3,3-diphenylacryloyl)oxy]benzene. The ultraviolet absorber may be a polymer-type ultraviolet absorber that is in the form of a copolymer of an ultraviolet absorptive monomer and/or a light-stable monomer with a monomer such as an alkyl (meth)acrylate as a result of having a structure of a radically polymerizable monomer compound. Preferred examples of the ultraviolet absorptive monomer include compounds containing a benzotriazole skeleton, a benzophenone skeleton, a triazine skeleton, a cyclic imino ester skeleton, or a cyanoacrylate skeleton in an ester substituent of a (meth)acrylic acid ester. In view of the ultraviolet absorbing ability, preferred among these are benzotriazole-based ultraviolet absorbers and hydroxyphenyltriazine-based ultraviolet absorbers. In view of the heat resistance and hue, preferred are cyclic imino ester-based ultraviolet absorbers and cyanoacrylate-based ultraviolet absorbers. Specific examples thereof include "Kemisorb 79" available from Chemipro Kasei Kaisha, Ltd. and "Tinuvin 234" available from BASF Japan Ltd. The ultraviolet absorbers may be used alone or in the form of a mixture of two or more.

The ultraviolet absorber is preferably present in an amount of 0.01 to 3 parts by mass, more preferably 0.01 to 1 part by mass, still more preferably 0.05 to 1 part by mass, particularly preferably 0.05 to 0.5 parts by mass, relative to 100 parts by mass of the resin composition of the disclosure.

(VIII) Antistatic Agent

The resin composition of the disclosure may need to have antistatic performance in some cases. In such cases, the resin composition of the disclosure preferably contains an antistatic agent. Examples of the antistatic agent include (1) phosphonium organosulfonates such as phosphonium arylsulfonates typified by phosphonium dodecylbenzenesulfonate, and phosphonium alkylsulfonates; and phosphonium borates such as phosphonium tetrafluoroborate. The phosphonium salt is appropriately present in an amount of 5 parts by mass or less, preferably 0.05 to 5 parts by mass, more preferably 1 to 3.5 parts by mass, still more preferably 1.5 to 3 parts by mass, relative to 100 parts by mass of the resin composition of the disclosure. Examples of the antistatic agent include (2) organosulfonic acid alkali (alkaline earth) metal salts such as lithium organosulfonates, sodium organosulfonates, potassium organosulfonates, caesium organosulfonates, rubidium organosulfonates, calcium organosulfonates, magnesium organosulfonates, and barium organosulfonates. These metal salts can also be used as flame retarders, as described above. Specific examples of the metal salts include metal salts of dodecylbenzenesulfonic acid and metal salts of perfluoroalkanesulfonic acids. The organosulfonic acid alkali (alkaline earth) metal salt is appropriately present in an amount of 0.5 parts by mass or less, preferably 0.001 to 0.3 parts by mass, more preferably 0.005 to 0.2 parts by mass, relative to 100 parts by mass of the resin composition of the disclosure. Particularly preferred are salts of alkali metals such as potassium, caesium, and rubidium.

Examples of the antistatic agent include (3) ammonium organosulfonates such as ammonium alkylsulfonates and ammonium arylsulfonates. The ammonium salt is appropriately present in an amount of 0.05 parts by mass or less relative to 100 parts by mass of the resin composition of the disclosure. Examples of the antistatic agent include (4) polymers containing a poly(oxyalkylene) glycol component as a constituent, such as polyether ester amide. The polymer is appropriately present in an amount of 5 parts by mass or less relative to 100 parts by mass of the resin composition of the disclosure.

(IX) Filler

The resin composition of the disclosure may contain any of a variety of fillers, other than fibrous fillers, known as reinforcing filler. Examples of such fillers include a variety of platy filler and powdery filler. The platy filler means filler in the form of a plate including one having a rough surface and one having a curved plate. The powdery filler means filler having a shape other than these shapes, including filler with indefinite shapes.

Preferred examples of the platy filler include glass flakes, talc, mica, kaolin, metal flakes, carbon flakes, and graphite, and platy filler prepared by coating the surface of any of these fillers with a different material such as a metal or a metal oxide. The particle size thereof is preferably 0.1 to 300 µm. For filler having a particle size within a range up to about 10 µm, the particle size corresponds to the median size (D50) in a particle size distribution determined by X-ray transmission that is one of liquid sedimentation techniques. For filler having a particle size within a range of 10 to 50 µm, the particle size corresponds to the median size (D50) in the particle size distribution determined by laser diffraction/scattering. For filler having a particle size within a range of 50 to 300 µm, the particle size corresponds to the particle size determined by vibration sieving. The particle size is the value in the resin composition. The platy filler may be surface-treated with any of a variety of coupling agents such as silane-based coupling agents, titanate-based coupling agents, aluminate-based coupling agents, and zirconate-based coupling agents. Alternatively, the platy filler may be a granulated product prepared by bundling the platy filler with any of a variety of resins such as olefinic resin, styrenic resin, acrylic resin, polyester-based resin, epoxy-based resin, and urethane-based resin or a higher fatty acid ester or by compressing the platy filler.

(X) Different Resin and/or Elastomer

The resin composition of the disclosure may contain a small proportion of a different resin and/or elastomer instead of part of the resin component to the extent that the effects of the disclosure are not impaired and can be achieved. The different resin and/or elastomer is preferably added in an amount of 20 parts by mass or less, more preferably 10 parts by mass or less, still more preferably 5 parts by mass or less, most preferably 3 parts by mass or less, relative to 100 parts by mass of the resin composition of the disclosure. Examples of the different resin include polyester resins such as polyethylene terephthalate and polybutylene terephthalate, and resins such as polyamide resin, polyimide resin, polyetherimide resin, polyurethane resin, silicone resin, polyphenylene ether resin, polyphenylene sulfide resin, polysulfone resin, polymethacrylate resin, phenol resin, and epoxy resin. Examples of the different elastomer include isobutylene-isoprene rubber, styrene-butadiene rubber, ethylene-propylene rubber, acrylic elastomers, polyester-based elastomers, polyamide-based elastomers, and core-shell elastomers such as methyl methacrylate-styrene-butadiene (MBS) rubber, methyl methacrylate-butadiene (MB) rubber, and methyl methacrylate-acrylonitrile-styrene (MAS) rubber, fluororubber, and a fluorine-containing elastomer.

(XI) Different Additive

The resin composition of the disclosure may contain a different additive such as a fluidity improver, an antibacterial agent, a dispersant such as a liquid paraffin, a light-catalytic soil resistant agent, or a photochromic agent.

In the resin composition of the disclosure, the sum of the aromatic polyether ketone resin (I) and the fluorine-containing copolymer (II) is preferably 50 to 100% by mass. With a sum of less than 50% by mass, the tensile elongation at break and flexibility are impaired, and desired mechanical properties may not be obtained.

The resin composition of the disclosure can be produced by melt-kneading the aromatic polyether ketone resin (I) and the fluorine-containing copolymer (II) while a high shear force is applied to these. Specifically, it can be produced by melt-kneading at a shear rate of 600 sec$^{-1}$ (/sec) or higher.

The disclosure also provides a method of producing a resin composition, the method including kneading the aromatic polyether ketone resin (I) and the fluorine-containing copolymer (II) at a shear rate of 600 sec$^{-1}$ or higher.

The shear rate is more preferably 700 sec$^{-1}$ (/sec) or higher, still more preferably 750 sec$^{-1}$ (/sec) or higher, particularly preferably 800 sec$^{-1}$ (/sec) or higher. This enables dispersion of the fluorine-containing copolymer (II) in the aromatic polyether ketone resin (I) in the order of submicrometers and can reduce the behavior of the fluorine-containing copolymer (II) to aggregate during molding. As a result, the resulting resin composition can be further excellent in fluidity and can provide a molded article further excellent in tensile properties, flexibility, impact resistance, and low permittivity.

The shear rate (γ) is a value determined by the following formula, for example.

$$\gamma = \pi D r / C$$

D: screw outer diameter (mm)
r: screw rotation speed (rpm)
C: tip clearance (mm)

The melt-kneading is preferably performed with a high shear force applied to the aromatic polyether ketone resin and the fluorine-containing copolymer. The melt-kneading may be performed with any apparatus, and may be performed even with a conventionally known apparatus such as a twin screw extruder, a single screw extruder, a multi-screw extruder, a roll kneader such as a tandem extruder or a batch kneader, a labo plastomill, a Banbury mixer, a pressurizing kneader, or a blending mill if kneading conditions (e.g., special screw, high rotation speed, and narrow clearance) are controlled. This enables dispersion of the fluorine-containing copolymer in the aromatic polyether ketone resin in the order of submicrometers and can reduce the behavior of the fluorine-containing copolymer to cause aggregation during molding. As a result, the resulting resin composition can provide a molded article that does not suffer peeling of the surface and that is further excellent in tensile properties, flexibility, impact resistance, and low dielectric properties. In order to apply a high shear force, a twin-screw extruder or a high shear processor (reflux high shear processor) including a kneading section provided with an internal return screw is preferably used.

The internal return screw is a screw provided with a return hole along the central axis of the screw from the tip toward the back end. In a high shear processor including a kneading section provided with an internal return screw, a molten resin charged into the kneading section is circulated such that it is sent toward the tip along with the rotation of the internal return screw, flows into the return hole through an inlet on the tip to the back side and exits through an outlet, and is again sent toward the tip along with the rotation of the internal return screw. This circulation can highly disperse and mix the molten resin and reduce the size of the dispersed phase. Examples of the high shear processor include devices disclosed in JP 2005-313608 A and JP 2011-046103 A.

When the kneader is a twin-screw extruder, it is preferably a twin-screw extruder having a large L/D screw structure. The screw structure of a twin-screw extruder more preferably satisfies L/D=30 or higher, more preferably L/D=35 or higher, still more preferably L/D=40 or higher. L/D means the ratio of effective screw length (L)/screw diameter (D). In order to improve the kneading performance and the productivity, the melt-kneading is most preferably performed using a twin-screw extruder.

The duration of the melt-kneading is preferably 1 to 600 sec, more preferably 5 to 300 sec. A melt-kneading duration longer than the above duration may cause significant degradation of the resin, and desired performance may not be achieved. A melt-kneading duration shorter than the above duration may cause poor dispersibility, and desired performance may not be achieved.

The temperature of the melt-kneading is required to be not lower than the melting point of the aromatic polyether ketone resin as well as not lower than the melting point of the fluorine-containing copolymer (II), preferably 240° C. to 450° C., more preferably 260° C. to 400° C.

The resin composition of the disclosure may be in any form, and may be in the form of pellet. In other words, a pellet obtainable by molding the resin composition of the disclosure is also one aspect of the disclosure.

The pellet of the disclosure may be obtainable by kneading the aromatic polyether ketone resin (I) and the fluorine-containing copolymer (II) to prepare the resin composition of the disclose, taking out the kneadate from the kneader, and then molding the resin composition into pellet, or may be obtainable by kneading the aromatic polyether ketone resin (I) and the fluorine-containing copolymer (II) using a kneader, and then extrusion-molding (e.g., melt-extruding) the kneadate from the kneader.

The molding may be performed by any method, and may be performed by melt extrusion using a twin-screw extruder, for example.

The pellet, which is molded from the resin composition, may be added to a known component which may be post-added. This addition to the pellet may be performed by a known method, and examples thereof include spraying with a spray to the pellet and dry-blending the pellet and powder of an additive. For example, a lubricant (e.g., magnesium stearate) may be added to the pellet after the molding. A molded article formed from the pellet is excellent in tensile elongation at break. The molded article is also excellent in impact resistance, flexibility, and low permittivity.

The pellet may be further kneaded after a known component which may be post-added is added thereto.

A pellet obtainable by molding the resin composition obtainable by the above production method and a pellet with a lubricant being added thereto after the molding are also aspects of the disclosure.

The components other than the aromatic polyether ketone resin (I) and the fluorine-containing copolymer (II) may be added to and mixed with the aromatic polyether ketone resin (I) and the fluorine-containing copolymer (II) in advance, or may be added to the aromatic polyether ketone resin (I) and the fluorine-containing copolymer (II) when these are blended.

A molded article formed from the resin composition or pellet of the disclosure is also one aspect of the disclosure.

The molded article formed from the resin composition of the disclosure can be commonly obtained by injection molding the pellet. In the injection molding, not only a common cold runner system for molding but also a hot runner system that enables runnerless molding can be used for the production. Furthermore, the injection molding can employ not only a common molding technique but also molding techniques such as gas-assisted injection molding, injection compression molding, ultra-high-speed injection molding, injection press molding, two-color molding, sandwich molding, in-mold coating molding, insert molding, foam molding (including one using a supercritical fluid), rapid heating and cooling molding, insulation molding, and in-mold re-melting molding and combinations of these. The injection molding can also employ film molding, extrusion molding, electrical wire molding by extrusion, tube molding, and sheet molding.

The disclosure also provides a molded article (hereinafter, also referred to as a "second molded article of the disclosure") containing the aromatic polyether ketone resin (I) and the fluorine-containing copolymer (II) and having a tensile elongation at break of 20% or higher.

The tensile elongation at break of the second molded article of the disclosure is preferably 20% or higher, more preferably 25% or higher. The tensile elongation at break can be controlled to 30% or higher or to 40% or higher using the resin composition of the disclosure. A higher tensile elongation at break is better, and the upper limit thereof is not limited. For example, the tensile elongation at break may be 200%.

The tensile elongation at break is a value determined in conformity with ASTM D 638 using an autograph at a test speed of 2 mm/min.

The second molded article of the disclosure preferably has a Charpy strength of 4 KJ/m$^2$ or higher, more preferably 9 KJ/m$^2$ or higher. A higher Charpy impact strength is better, and the upper limit thereof is not limited. For example, the Charpy impact strength may be 200 KJ/m$^2$.

The Charpy strength is a value determined in conformity with ASTM D6110-02.

The second molded article of the disclosure preferably satisfies in a cross-cut test that the percentage of the number of peeled squares is lower than 20% of the total number of squares in a grid. A molded article satisfying that the percentage of the number of peeled squares is lower than 20% of the total number of squares in a grid may less cause surface peeling and can have improved tensile elongation at break and retain other mechanical properties. Furthermore, the molded article can retain good appearance.

The cross-cut test is performed on the molded article in conformity with JIS K 5400 for evaluation based on the number of peeled squares in a 25-square grid with each square having a size of 1 mm×1 mm.

In the second molded article of the disclosure, the fluorine-containing copolymer (II) preferably has an average dispersed particle size of 4 μm or smaller. In order to provide a molded article having higher properties and to achieve better moldability, the average dispersed particle size of the fluorine-containing copolymer (II) is more preferably 3 μm or smaller, still more preferably 2.5 μm or smaller. The lower limit of the average dispersed particle size may be, but is not limited to, 0.01 μm.

In the second molded article of the disclosure, the fluorine-containing copolymer (II) preferably has a maximum dispersed particle size of 10 μm or smaller. In order to achieve better mechanical properties, the maximum dispersed particle size of the fluorine-containing copolymer (II) is more preferably 5 μm or smaller. The lower limit of the maximum dispersed particle size may be, but is not limited to, 0.01 μm or smaller.

The average dispersed particle size and maximum dispersed particle size of the fluorine-containing copolymer (II) in the second molded article of the disclosure are determined according to a procedure similar to that for determining those of the resin composition of the disclosure.

The second molded article of the disclosure preferably has a relative permittivity of 2.60 or lower, more preferably 2.58 or lower, still more preferably 2.55 or lower. Also, the relative permittivity is more preferably 2.30 or higher. As the relative proportion of the fluorine-containing copolymer increases to the point where the relative permittivity is less than 2.30, the mechanical properties greatly decrease and desired mechanical properties are difficult to obtain.

The relative permittivity is a value determined by a cavity resonator perturbation method.

The aromatic polyether ketone resin (I) and the fluorine-containing copolymer (II) in the second molded article of the disclosure are the same as those described for the resin composition of the disclosure.

The second molded article of the disclosure may employ as appropriate the same embodiment of the molded article formed from the above-described resin composition or pellet of the disclosure.

The disclosure relates to a resin composition containing:
an aromatic polyether ketone resin (I); and
a fluorine-containing copolymer (II),
the resin composition satisfying an r2/r1 ratio of 1.60 or lower,
wherein r1 is an average dispersed particle size of the fluorine-containing copolymer (II) and r2 is an average dispersed particle size of the fluorine-containing copolymer (II) after melt flow rate measurement at 380° C. and a load of 5000 g and with a preheating time of five minutes in conformity with ASTM D1238.

Preferably, the aromatic polyether ketone resin (I) has a melting point of 300° C. to 380° C.

Preferably, the aromatic polyether ketone resin (I) has a glass transition temperature of 130° C. to 220° C.

Preferably, the fluorine-containing copolymer (II) has a melting point of 200° C. to 323° C.

Preferably, the fluorine-containing copolymer (II) is a copolymer of tetrafluoroethylene and a perfluoroethylenic unsaturated compound represented by the following formula (1):

$$CF_2=CF-Rf^1 \quad (1)$$

wherein $Rf^1$ is $-CF_3$ or $-ORf^2$, where $Rf^2$ is a C1-C5 perfluoroalkyl group.

Preferably, the aromatic polyether ketone resin (I) and the fluorine-containing copolymer (II) are present in the resin composition of the disclosure in a mass ratio (I):(II) of 99:1 to 30:70.

Preferably, the resin composition of the disclosure further contains a fibrous filler (III).

The disclosure also relates to a pellet which is obtainable by molding the resin composition.

The disclosure also relates to a molded article formed from the resin composition or the pellet.

EXAMPLES

The disclosure is described with reference to, but not limited to, examples.
<Melt Flow Rate (MFR)>
(1) The MFR of the fluorine-containing copolymer is measured using a melt indexer at 380° C. and a load of 5000 g in conformity with ASTM D1238.

(2) The MFR of the aromatic polyether ketone resin is measured using a melt indexer at 380° C. and a load of 5000 g in conformity with ASTM D1238.

(3) The MFR of a resin composition obtained by mixing the fluorine-containing copolymer and the aromatic polyether ketone resin is a value measured at a temperature of 380° C. and a load of 5000 g and with a preheating time of five minutes in conformity with ASTM D1238.
<Melting Point>
The melting point of the fluorine-containing copolymer was determined as the temperature corresponding to the maximum value on a heat-of-fusion curve with a temperature-increasing rate of 10° C./min using a differential scanning calorimeter (DSC).

The melting point of the aromatic polyether ketone resin was determined as the temperature corresponding to the maximum value on a heat-of-fusion curve with a temperature-increasing rate of 10° C./min using a differential scanning calorimeter (DSC).
<Glass Transition Temperature (Tg)>
The Tg is measured using a differential scanning calorimeter (DSC).
<Calculation of Average Dispersed Particle Size>
Pieces were cut out of the kneadates (resin compositions) obtained in the examples, the strands obtained by the MFR measurement in the examples, and the injection molded articles (molded articles) obtained in the examples and were cut perpendicularly to the flow direction. The cross-section of each piece was photographed using a confocal laser scanning microscope and the resulting microscopic images were analyzed using image analysis software (Image J). The dispersed phases were selected and the equivalent circle diameters were determined. The equivalent circle diameters of 20 dispersed phases were calculated and averaged to determine the average dispersed particle size r1 and the average dispersed particle size r2.
<Shear Rate During Kneading>
The shear rate (γ) during kneading was determined using the following formula.

$$\gamma = \pi D r/C$$

D: screw outer diameter (mm)
r: screw rotation speed (rpm)
C: tip clearance (mm)
<Preparation of Injection Molded Article>
Each of the resin compositions produced in the examples and the comparative examples was dried at 120° C. for eight hours and injection molded using a small injection molding apparatus, whereby an ASTM multipurpose specimen (127× 12.7×3.2 mmt) and an ASTM type V dumbbell were obtained.
<Measurement of Tensile Elongation at Break>
The tensile elongation at break of the injection molded article prepared by the above-described technique was measured using an autograph in conformity with ASTM D638. For the measurement conditions, the test rate was 2 mm/min.
<Measurement of Relative Permittivity>
The strand formed in the above-described measurement of the melt flow rate was cut into a strip with a width of 2 mm and a length of 100 mm. The relative permittivity of the strip was measured at 2.45 GHz by a cavity resonator perturbation method (network analyzer).
<Cross-Cut Test>
The injection molded article prepared by the above-described technique was subjected to evaluation in conformity with JIS K 5400 based on the number of peeled squares in a 25-square grid with each square having a size of 1 mm×1 mm.

The following describes the materials used in the examples and the comparative examples.

Aromatic polyether ketone resin (1): polyetherketoneketone (MFR: 40.2 g/10 min, melting point: 331° C., Tg: 162° C.)

Aromatic polyether ketone resin (2): polyetherketoneketone (MFR: 79.5 g/10 min, melting point: 360° C., Tg: 165° C.)

Aromatic polyether ketone resin (3): polyetheretherketone (MFR: 24.5 g/10 min, melting point: 340° C., Tg: 143° C.)

Aromatic polyether ketone resin (4): polyetheretherketone (MFR: 75.6 g/10 min, melting point: 343° C., Tg: 143° C.)

Aromatic polyether ketone resin (5): polyetheretherketone (MFR: 10.0 g/10 min, melting point: 342° C., Tg: 143° C.)

Aromatic polyether ketone resin (6): polyetheretherketone (MFR: 29.6 g/10 min, melting point: 340° C., Tg: 143° C.)

Fluorine-containing copolymer (1): TFE/HFP/PPVE copolymer (MFR: 29.8 g/10 min, melting point: 260° C.)

Fluorine-containing copolymer (2): TFE/HFP/PPVE copolymer (MFR: 12.3 g/10 min, melting point: 255° C.)

Fluorine-containing copolymer (3): TFE/PPVE copolymer (MFR: 31.4 g/10 min, melting point: 301° C.)

Chopped glass fiber (1) with circular cross-section: 10 μm in fiber diameter, 3 mm in cut length Example 1

The aromatic polyether ketone resin (1) and the fluorine-containing copolymer (1) were dry-blended in the ratio (% by mass) shown in Table 1 and dried at 120° C. for eight hours. The dried mixture was melt-kneaded using a reflux high shear processor available from Niigata Machine Techno Co., Ltd. under the following predetermined conditions.

The return hole used had a diameter of 2.5 mm.
Screw L/D: 1.8
Kneading temperature: 370° C.
Shear rate during kneading: 870 $\sec^{-1}$
Kneading duration: 10 sec Examples 2 and 3

Resin compositions were produced as in Example 1 except that the type of the aromatic polyether ketone resin and the type of the fluorine-containing copolymer were changed as shown in Table 1. The physical properties were also measured as described above. The results are shown in Table 1.

Examples 4 to 6

The aromatic polyether ketone resin (3) and the fluorine-containing copolymer (1) were pre-mixed in each ratio (% by mass) shown in Table 1 and melt-kneaded using a twin-screw extruder (diameter=30 mm, L/D=36) at a cylinder temperature of 390° C., whereby resin compositions were produced. The physical properties of the resulting resin compositions were measured as in Example 1. The results are shown in Table 1.

Example 7

The aromatic polyether ketone resin (1), the fluorine-containing copolymer (1), and the chopped glass fiber (1) were dry-blended in the ratio (% by mass) shown in Table 2 and dried at 120° C. for eight hours. The dried mixture was melt-kneaded using a reflux high shear processor available from Niigata Machine Techno Co., Ltd. under the following predetermined conditions. The return hole used had a diameter of 2.5 mm.
Screw L/D: 1.8
Kneading temperature: 370° C.
Shear rate during kneading: 870 $\sec^{-1}$
Kneading duration: 10 sec Comparative Examples 1 to 3

Resin compositions were produced as in Example 1 except that the type of the aromatic polyether ketone resin and the type of the fluorine-containing copolymer were changed as shown in Table 1 and a twin-screw extruder with a diameter of 15 mm and a L/D of 60 was used. The physical properties were measured as described above. The results are shown in Table 1.

Comparative Example 4

A resin composition was produced as in Example 1 except that the type of the aromatic polyether ketone resin and the type of the fluorine-containing copolymer were changed as shown in Table 1 and Labo Plastomill was used instead of a twin-screw extruder. The physical properties were measured as described above. The results are shown in Table 1.

Comparative Examples 5 and 6

Resin compositions were produced as in Comparative Example 3 except that the type of the aromatic polyether ketone resin and the type of the fluorine-containing copolymer were changed as shown in Table 1. The physical properties were measured as described above. The results are shown in Table 1.

Comparative Example 7

A resin composition was produced as in Example 7 except that the aromatic polyether ketone resin (1), the fluorine-containing copolymer (1), and the chopped glass fiber (1) were dry-blended in the ratios (% by mass) shown in Table 2 and dried at 120° C. for eight hours and a twin-screw extruder with a diameter of 15 mm and L/D of 60 was used. The physical properties were measured as described above. The results are shown in Table 2.

TABLE 1

|  | Example 1 | Example 2 | Example 3 | Example 4 | Example 5 | Example 6 |
|---|---|---|---|---|---|---|
| Aromatic polyether ketone resin | (1) | (2) | (2) | (3) | (4) | (4) |
| Fluorine-containing copolymer | (1) | (1) | (3) | (1) | (2) | (2) |
| Compositional ratio of aromatic polyether ketone resin/fluorine-containing copolymer (ratio by mass %) | 80/20 | 80/20 | 80/20 | 80/20 | 50/50 | 40/60 |

TABLE 1-continued

|  | | | | | | |
|---|---|---|---|---|---|---|
| Melting point of aromatic polyether ketone resin (° C.) | 331 | 360 | 360 | 340 | 343 | 343 |
| Glass transition temperature of aromatic polyether ketone resin (° C.) | 162 | 165 | 165 | 143 | 143 | 143 |
| Shear rate during kneading (sec$^{-1}$) | 870 | 870 | 870 | 2450 | 2450 | 2450 |
| Particle size r1 before MFR measurement (μm) | 0.32 | 0.41 | 0.88 | 0.32 | 1.49 | 1.43 |
| Particle size r2 after MFR measurement (μm) | 0.41 | 0.45 | 0.78 | 0.41 | 2.05 | 2.10 |
| Particle size ratio (r2/r1) | 1.28 | 1.10 | 0.89 | 1.28 | 1.38 | 1.47 |
| MFR (g/10 min) | 26 | 62 | 57 | 18 | 41 | 30 |
| Tensile elongation at break (%) | 146 | 123 | 111 | 72 | 30 | 43 |
| Relative permittivity | 2.5 | 2.5 | 2.5 | 3.2 | 2.9 | 2.8 |
| Cross-cut test (number) | 0 | 0 | 0 | 2 | 3 | 4 |

|  | Comparative Example 1 | Comparative Example 2 | Comparative Example 3 | Comparative Example 4 | Comparative Example 5 | Comparative Example 6 |
|---|---|---|---|---|---|---|
| Aromatic polyether ketone resin | (1) | (1) | (5) | (6) | (6) | (6) |
| Fluorine-containing copolymer | (1) | (3) | (1) | (1) | (1) | (1) |
| Compositional ratio of aromatic polyether ketone resin/fluorine-containing copolymer (ratio by mass %) | 80/20 | 80/20 | 80/20 | 80/20 | 80/20 | 60/40 |
| Melting point of aromatic polyether ketone resin (° C.) | 331 | 331 | 342 | 340 | 340 | 360 |
| Glass transition temperature of aromatic polyether ketone resin (° C.) | 162 | 162 | 143 | 143 | 143 | 143 |
| Shear rate during kneading (sec$^{-1}$) | 470 | 300 | 550 | 175 | 550 | 550 |
| Particle size r1 before MFR measurement (μm) | 2.8 | 2.3 | 1.51 | 0.6 | 1.84 | 2.33 |
| Particle size r2 after MFR measurement (μm) | 4.50 | 3.90 | 3.60 | 1.06 | 4.14 | 4.35 |
| Particle size ratio (r2/r1) | 1.61 | 1.70 | 2.38 | 1.77 | 2.25 | 1.87 |
| MFR (g/10 min) | 43 | 66 | 21 | 19 | 22 | 14 |
| Tensile elongation at break (%) | No elongation | No elongation | 18 | 19 | 19 | No elongation |
| Relative permittivity | 2.5 | 2.5 | 3.2 | 3.2 | 3.2 | 3.0 |
| Cross-cut test (number) | 13 | 25 | 15 | 23 | 22 | 25 |

TABLE 2

|  | Example 7 | Comparative Example 7 |
|---|---|---|
| Aromatic polyether ketone resin | (1) | (1) |
| Fluorine-containing copolymer | (1) | (1) |
| Aromatic polyether ketone resin/Fluorine-containing copolymer/Fibrous filler (ratio by mass %) | 60/20/20 | 60/20/20 |
| Melting point of aromatic polyether ketone resin (° C.) | 331 | 331 |
| Glass transition temperature of aromatic polyether ketone resin (° C.) | 162 | 162 |
| Shear rate during kneading (sec$^{-1}$) | 870 | 470 |
| Particle size r1 before MFR measurement (μm) | 0.38 | 3.1 |
| Particle size r2 after MFR measurement (μm) | 0.45 | 5.30 |
| Particle size ratio (r2/r1) | 1.18 | 1.71 |
| MFR (g/10 min) | 15 | 33 |
| Tensile elongation at break (%) | 6 | No elongation |
| Relative permittivity | 3.5 | 3.5 |
| Cross-cut test (number) | 0 | 10 |

What is claimed is:

1. A resin composition comprising:
   an aromatic polyether ketone resin (I); and
   a fluorine-containing copolymer (II),
   the resin composition satisfying an r2/r1 ratio of 1.60 or lower,
   wherein r2 is an average dispersed particle size of the fluorine-containing copolymer (II) measured after conducting a melt flow rate measurement at 380° C. and a load of 5000 g and with a preheating time of five minutes in conformity with ASTM D1238, the measurement being performed on a solid of the fluorine-containing copolymer (II) obtained after the melt flow rate measurement, and r1 is an average dispersed particle size of the fluorine-containing copolymer (II) measured prior to conducting the melt flow measurement.

2. The resin composition according to claim 1, wherein the aromatic polyether ketone resin (I) has a melting point of 300° C. to 380° C.

3. The resin composition according to claim 1, wherein the aromatic polyether ketone resin (I) has a glass transition temperature of 130° C. to 220° C.

4. The resin composition according to claim 1, wherein the fluorine-containing copolymer (II) has a melting point of 200° C. to 323° C.

5. The resin composition according to claim 1, wherein the fluorine-containing copolymer (II) is a copolymer of tetrafluoroethylene and a perfluoroethylenic unsaturated compound represented by the following formula (1):

$$CF_2=CF-Rf^1 \tag{1}$$

wherein $Rf^1$ is $-CF_3$ or $-ORf^2$, where $Rf^2$ is a C1-C5 perfluoroalkyl group.

6. The resin composition according to claim 1, wherein the aromatic polyether ketone resin (I) and the fluorine-containing copolymer (II) are present in a mass ratio (I): (II) of 99:1 to 30:70.

7. The resin composition according to claim 1, further comprising a fibrous filler (III).

8. A pellet obtained by molding the resin composition according to claim 1.

9. A molded article formed from the pellet according to claim 8.

10. A molded article formed from the resin composition according to claim 1.

* * * * *